(12) United States Patent
Nicolosi

(10) Patent No.: US 11,817,010 B2
(45) Date of Patent: Nov. 14, 2023

(54) MEDICAL LEARNING DEVICE BASED ON INTEGRATING PHYSICAL AND VIRTUAL REALITY WITH THE AIM OF STUDYING AND SIMULATING SURGICAL APPROACHES AT ANATOMICAL LOCATIONS

(71) Applicant: UPSURGEON S.R.L, Milan (IT)

(72) Inventor: Federico Nicolosi, Milan (IT)

(73) Assignee: UPSURGEON S.R.L, Milan (IT)

( * ) Notice: Subject to any disclaimer, the term of this patent is extended or adjusted under 35 U.S.C. 154(b) by 243 days.

(21) Appl. No.: 17/422,275

(22) PCT Filed: Jan. 14, 2020

(86) PCT No.: PCT/IB2020/050258
§ 371 (c)(1),
(2) Date: Jul. 12, 2021

(87) PCT Pub. No.: WO2020/148643
PCT Pub. Date: Jul. 23, 2020

(65) Prior Publication Data
US 2022/0093008 A1 Mar. 24, 2022

(30) Foreign Application Priority Data
Jan. 14, 2019 (IT) .................. 102019000000583

(51) Int. Cl.
*G09B 23/34* (2006.01)
*G06T 7/70* (2017.01)
(Continued)

(52) U.S. Cl.
CPC ............... *G09B 23/34* (2013.01); *G06T 7/70* (2017.01); *G06T 13/20* (2013.01); *G06T 19/006* (2013.01);
(Continued)

(58) Field of Classification Search
CPC ......... G06T 2207/30204; G06T 19/006; G06T 7/70; G09B 19/00; G09B 19/003;
(Continued)

(56) References Cited

U.S. PATENT DOCUMENTS

2012/0280988 A1\* 11/2012 Lampotang .......... G09B 23/285
434/262
2015/0351860 A1 12/2015 Piron et al.

FOREIGN PATENT DOCUMENTS

| CN | 105788390 A | 7/2016 |
|---|---|---|
| EP | 2 996 105 A1 | 3/2016 |
| WO | WO-2018/071999 A1 | 4/2018 |

OTHER PUBLICATIONS

International Search Report and Written Opinion on International Patent Application No. PCT/IB2020/050258, dated Mar. 12, 2020 (9 pages).
(Continued)

*Primary Examiner* — Timothy A Musselman
(74) *Attorney, Agent, or Firm* — Foley & Lardner LLP

(57) ABSTRACT

The present invention relates to a system and a method for simulating human surgical anatomy for the purposes of beginner anatomical teaching and advanced surgical teaching, and more specifically concerns a device which reproduces a part of the human head or of other human anatomical parts, reproducing the associated anatomy, movement in space, and surgical approach methods thereof.

15 Claims, 10 Drawing Sheets

(51) Int. Cl.
*G06T 13/20* (2011.01)
*G06T 19/00* (2011.01)
*G09B 19/00* (2006.01)

(52) U.S. Cl.
CPC .. *G09B 19/003* (2013.01); *G06T 2207/30204* (2013.01)

(58) Field of Classification Search
CPC ...... G09B 19/006; G09B 23/28; G09B 23/30; A61B 5/0042; A61B 19/5244; A61B 5/00; A61B 5/055; A61B 5/145
See application file for complete search history.

(56) References Cited

OTHER PUBLICATIONS

Chinese office action on CN 202080016771.3 dated Jul. 10, 2023.

\* cited by examiner

MEDICAL LEARNING DEVICE BASED ON INTEGRATING PHYSICAL AND VIRTUAL REALITY WITH THE AIM OF STUDYING AND SIMULATING SURGICAL APPROACHES AT ANATOMICAL LOCATIONS

CROSS-REFERENCE TO RELATED APPLICATIONS

This application is a U.S. National Stage Application under 35 U.S.C. § 371 of International Patent Application No. PCT/IB2020/050258, filed on Jan. 14, 2020, which claims priority to Italian Patent Application No. 102019000000583, filed on Jan. 14, 2019, the content of each of which is incorporated herein by reference in its entirety.

TECHNICAL FIELD

The present invention generally relates to the sector of human surgical anatomy simulation, for the purposes of anatomical and surgical teaching, for example.

TECHNICAL BACKGROUND

The anatomy of the skull and brain, and more generally that of the central nervous system, exhibits a high level of complexity. Therefore, understanding it and learning its three-dimensional morphology requires in-depth study and necessitates repeated practical and observational exercises, both on models and on anatomical items in the context of the dissection laboratory. These exercises require models which are as faithful as possible to reality, since it is not always possible to have access to direct experience in the operating room. In every case, regardless of the possibility of access to the operating room, the learning curve for neuroanatomy and neurosurgery remains very long.

As for the nervous system and more particularly the skull and the structures contained therein, the complexity is even higher because of the intricate spatial relationships and the microsurgical possibilities.

When opening of the cranial cavity (craniotomy) is performed for surgical intervention, the view of the interior and thus of the brain and the other anatomical structures is necessarily extremely limited to what is strictly necessary: it is essential to reduce the extent of the exposed area as much as possible so as to increase the tolerability of the surgical treatment for the patient and to reduce the risk of complications.

Further, it is noted that the view is often inverted and has anatomical relationships and perspectives that are difficult to intuit and understand because of the microscopic magnification.

For the above reasons, even a small error in the spatial orientation of the anatomical part for intervention, in this case the head, or in the positioning of the craniotomy opening (although the same applies to interventions for example on the spinal marrow or on other anatomical areas) can bring about significant problems in visualising the surgical target and compromise the outcome of the intervention.

Since the patient is positioned on the hospital bed before the start of the intervention (before the skin is incised), it is necessary to anticipate the internal surgical view exactly in advance of the surgical access (surgical approach). In the case of the brain, for example, once the patient is positioned and anaesthesia induced, the head is fixed to a grip (headboard) and will remain fixed for the entire duration of the procedure. Therefore, once the intervention is started, the possible adjustments by the surgeon are extremely limited, and relate exclusively to his own position with respect to the surgical field. Therefore, the positioning of the head of the patient requires a high level of familiarity with anatomy and a three-dimensional visualisation ability that makes it possible for the surgeon to visualise which would be the appropriate view prior to making the opening. An error in the positioning of the head of the patient would constrain the surgeon to operating in an unergonomic position for the entire duration of the intervention, generally for a duration of several hours. The uncomfortable and unnatural position of the surgeon may cause muscular fatigue, generating positional shakes which could compromise the fluency and quality of the microsurgical action.

The potential incorrect positioning of the head could also alter the perception of the perspective relationships between the anatomical structures, disorientating the surgeon and increasing the risk of errors (incorrect partial resection of tumours which in reality are perfectly reachable; accidental lesions to anatomical structures which are to be preserved).

Devices for anatomical learning consisting of anatomical models which reproduce the skull and in some cases the structures contained therein are available commercially. These models make it possible to study anatomy by reproducing the central nervous system, generally using anatomical displays, or else by disassembling the parts, in other words not surgical displays (by means of craniotomy approaches).

The commercially available devices usually consist of a reproduction, for example of the cranial cavity, and one or more internal structures reproducing the interior of the head (brain, brain stem, nerves, blood vessels), with variable levels of approximation and simplification (rigid structures, smaller structures not shown or reproduced as part of larger structures etc.).

Usually, the intracranial content is thus represented by a series of rigid modular elements, each of which reproduces a part of the brain.

This solution, although it provides a useful supplement to basic study (degree course in medicine and surgery) of the central nervous system, has some drawbacks.

The first problem is that the access to the interior of the cranial cavity of these models generally does not take place through an opening which corresponds to a neurosurgical approach, but rather takes place by mechanical decomposition of the pieces of the model, and thus by an anatomical, not surgical, representation logic (for example a rough section).

One result of this limitation is that the student cannot learn the correct perspective of the various internal parts with respect to one another from a surgical perspective (craniotomy of a few centimetres), a perspective which may also vary significantly as a function of the positioning of the cranial opening and of the three-dimensional spatial orientation of the skull.

Moreover, smaller but nevertheless important elements, such as the blood vessels and nerves, are usually not shown as independent parts but rather as parts of larger elements, and this does not allow the user/student to understand them in the correct position and significance thereof, since it does not allow correct study and sufficient preparation of the surgeon for the intervention.

Other devices capable of representing larger anatomical details are often limited in terms of the type of physical consistency of the structures themselves as well as in the superficial appearance. Therefore, since surgical learning relates not only to visual learning but also to microsurgical manipulation, these rigid devices do not offer a relevant type of tactile experience in didactic terms.

A further disadvantage of currently available anatomical devices is that they do not make it possible to reproduce the various dissection steps of the soft tissues, for example epicranial tissues (incising the skin, incising the subcutaneous and muscle tissues, performing a craniotomy, incising the cerebral meninges).

Another disadvantage of the prior art is that the student at an advanced stage (doctor in specialist neurosurgical training) cannot, with the currently available devices, simulate the surgical position on an operating area or the microsurgical manipulation of biological tissues using suitable surgical instruments.

Another disadvantage of the prior art is that although it is possible to have physical anatomical models capable of simulating microsurgical perspectives, these models do not suggest what the steps are for performing the surgical approach (e.g. incising the skin etc.)

OBJECT OF THE INVENTION

The main aim of the present invention is to implement a device which reproduces the morphology of the skull, or part thereof, and the contents thereof, or of other anatomical regions of the nervous system or of other body locations, and simulates surgical accesses and spatial movements thereof, with the objective of overcoming, at least in part, the problems of the prior art.

SUMMARY OF THE INVENTION

These and other objects, made clearer hereinafter, are achieved by a system for simulating the movement and morphology of an anatomical part of the human body, including: a digital image processing system; a three-dimensional physical module for partially representing an anatomical part of the human body comprising a container that delimits a volume defined in the context of a predetermined anatomical location, comprising a plurality of anatomical elements, the container having an opening representing a predetermined surgical window for operating within the anatomical location included in the container; a support movable in three dimensions to position and orientate the physical module in three-dimensional space; a plurality of associated markers positioned on the container and on the anatomical elements, each of the plurality of markers being suitable for identifying the position in three-dimensional space and one or more characteristics of the container or of the associated anatomical part and transmitting the information on the position and on the one or more features to the digital image processing system; an image acquisition system suitable for capturing the image of the container, the anatomical elements and the markers and transmitting them to the image processing system, the image processing system being adapted to generate an augmented reality view based on the information received from the markers and from the image acquisition system and to represent said view on a monitor.

In a preferred embodiment of the present invention, the container represents a portion of the human skull and the opening is a craniotomy/craniectomy window.

Preferably, the anatomical elements comprise one or more of the following: cerebral/cerebellar parenchyma, brainstem, cranial nerves, arterial/venous vessels, venous sinuses, meninges (dura mater, arachnoid, pia mater), biological fluids (cephalorachidian fluid, blood), each of the plurality of anatomical elements included in the container being made of material that reproduces the physical characteristics of the corresponding real anatomical element.

In one possible embodiment, the opening of the container is covered so as to simulate an integral portion of human skull corresponding to a predetermined surgical window for operating within the anatomical part included in the container, the portion of human skull being prepared to be incised during a surgical simulation of a craniotomy/craniectomy intervention.

The support may be connected to the image processing system and set up to transmit information on the position and orientation of the container to the digital image processing system. In this case, the augmented reality view generated and displayed by the digital image processing system is also based on the information received from the support. In a preferred embodiment, the support comprises three concentric spherical caps, each of the spherical caps being set up to move along one of the spatial coordinates of a three-dimensional Cartesian system.

In a preferred embodiment, the partial representation module is set up to receive a plurality of interchangeable containers, each interchangeable container representing a different portion of the anatomical location.

The present invention also relates to the interchangeable container representing a portion of an anatomical part of the human body, comprising a plurality of anatomical elements, the container being suitable for use in the system described above.

A further aspect of the present invention implements a method for simulating the movement and morphology of an anatomical part of the human body by means of a system as described above, the method comprising the steps of: acquiring, through the image acquisition system, a representation of the plurality of anatomical elements; receiving information on the position and orientation of the container from the movable support; acquiring, from the at least one marker, information on the position and one or more characteristics of the anatomical element associated with each marker; generating an augmented reality view of the anatomical part, and representing said view on a monitor.

In a preferred embodiment, the method is used for simulating neurosurgical procedures characterised by the sequential integration of virtual simulation phases, based on virtual representations of the surgical scenario, and physical simulation phases, based on physical representations of said scenario.

BRIEF DESCRIPTION OF THE DRAWINGS

The features and advantages of the device and method according to the present invention will be more clearly apparent from the following description of an embodiment, given by way of non-limiting example with reference to the accompanying drawings, in which.

DETAILED DESCRIPTION

Figure 1:
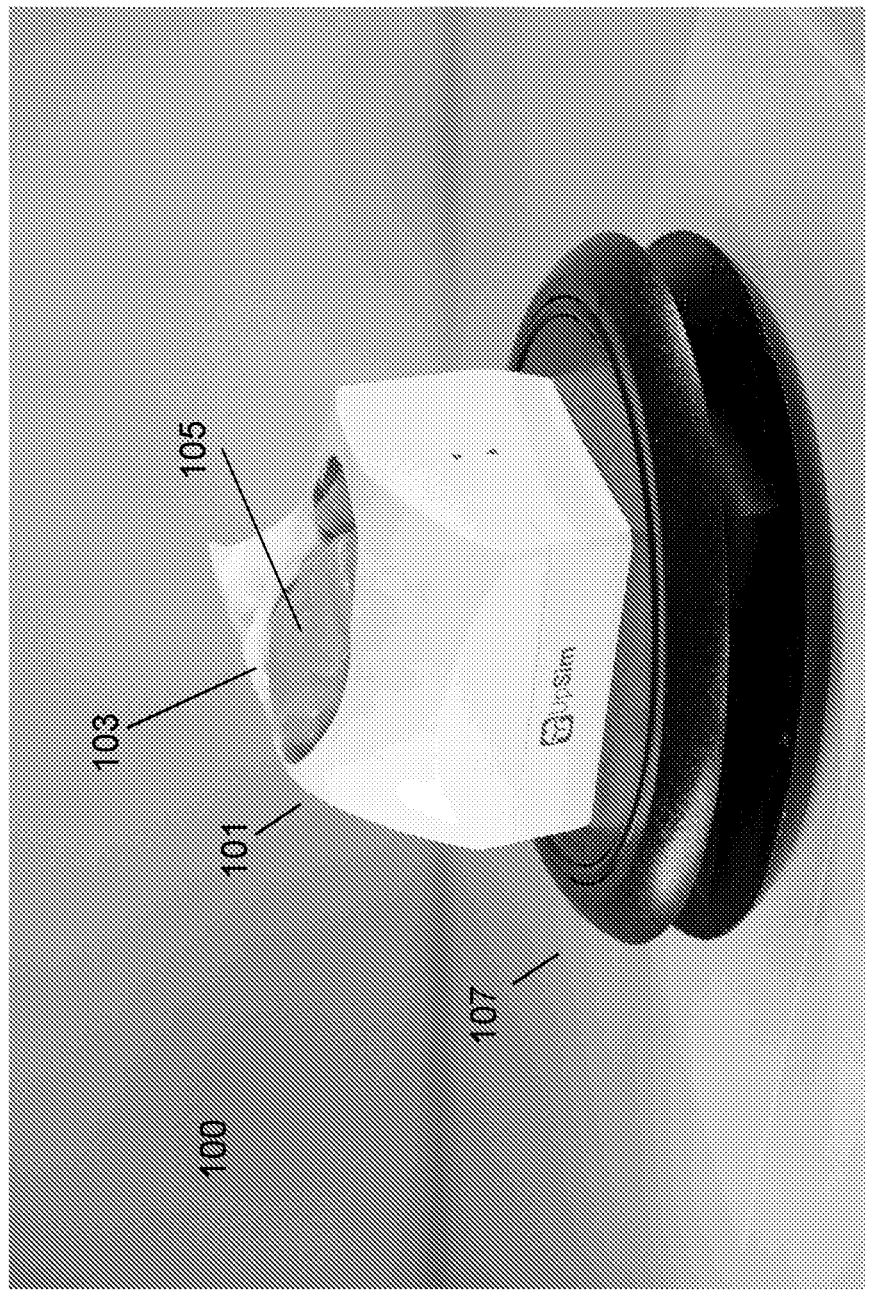
FIG. 1 is a general view of the surgical simulator according to a preferred embodiment of the present invention.

The present invention relates to a system and a method for simulating human surgical anatomy aimed at beginner anatomical teaching and advanced surgical teaching, and more specifically concerns a device which reproduces a part of the human head or of other human anatomical parts, reproducing the associated anatomy, movement in space, and surgical approach methods. The present invention potentially relates to all traditional surgical disciplines, thus potentially being applicable to all human anatomical locations. The application exemplified herein is neurosurgical, but experts in the field will have no difficulty in understanding that with appropriate adaptations it can be extended to other areas.

The device according to the present invention is intended for use with the aim of studying and learning the surgical anatomy of the nervous system or of other anatomical locations. Without wishing to limit the scope of application, the present discussion will concentrate on the central nervous system, in particular the neuroanatomical structures situated within the cranial cavity (cerebral/cerebellar parenchyma, brainstem, cranial nerves, arterial/venous vessels, venous sinuses). Those skilled in the art will have no difficulty in appreciating that the system and model of the present invention can be applied to studying and learning the anatomy of other parts of the nervous system, for example the spinal column, or even, with the appropriate adaptations, to completely different anatomical areas.

The embodiments of the present invention described hereinafter relate to a device for simulating neurosurgical scenarios aimed primarily at the two following objects:

learning and specialist training in the neurosurgical field pre-operative planning and simulation of specific ("patient-specific") neurosurgical scenarios.

Neurosurgical approaches refer to a specific access path to a neuroanatomical structure or region, for example intracranial. In the case of the brain, this depends on a precise cranial window, known as a craniotomy. The neurosurgical discipline provides many approaches which are standardised in technical terms, these being distinguished on the basis of the cranial region through which they are produced. For example, frontal approach, temporal approach etc. A neurosurgical approach provides various steps, for example incising the skin, craniotomy (performing the craniotomy), etc.

In neurosurgery, in particular in cranial neurosurgery, every neurosurgical scenario is dependent on a precise craniotomy, and every craniotomy provides a standard sequence of preceding and following surgical steps: incising the skin, dissecting the subcutaneous/muscle tissues, a drillhole, craniotomy, removal of the bone flap, dural incision, intracranial exploration of the soft tissues (encephalon, vascular structures, nerves).

The simulation device according to a preferred embodiment of the present invention is designed and developed for simulating different neurosurgical scenarios. In particular, it reproduces the steps provided in each of the simulated approaches with the aid of a series of physical components (e.g. material models) and virtual components (e.g. 3D animations, augmented reality etc.) Combining these elements in sequence reproduces the complete procedural workflow necessary for performing the neurosurgical approach as codified in academia. The simulation device according to a preferred embodiment of the present invention may, in addition to normal anatomical scenarios, i.e. scenarios free of a displayed pathology, also contain pathological scenarios. These scenarios may in some instances reproduce real cases.

In a preferred embodiment of the present invention, each surgical scenario (or simulation) is characterised by 2 distinct elements:

aim of the simulation development and implementation of the models and of the physical and technological components involved in the simulated execution of the complete surgical procedure in view of the aim of the simulation.

According to these characteristics, the simulation of each surgical scenario is implemented with differing levels of complexity and completeness in both the physical and the digital components thereof.

The device according to a preferred embodiment of the present invention is considered to be a simulation system inasmuch as:

It is designed in a multidisciplinary form, or as a set of specialist simulation apparatuses. The present description refers specifically to uses for neurosurgery. Those skilled in the art will easily appreciate that the device according to the present invention can also be modified and adapted for application to other anatomical/surgical locations, e.g.: maxillofacial surgery, otorhinolaryngology, plastic surgery, spinal surgery, thoracic surgery, heart surgery, gynaecological and urological surgery, orthopaedic surgery.

It is based on the combination of multiple technologies, and operates using multiple components of different natures, both physical and virtual, which when appropriately configured coexist and cooperate in implementing the complete simulation of a particular surgical procedure or a particular pathological condition. One of the advantages of the simulation device according to a preferred embodiment of the present invention is the possibility of concentrating on representing a delimited anatomical scenario. In the case of neurosurgery, for example, this scenario may constitute a portion of a human skull and of the anatomical structures contained therein (brain hemispheres, brain stem, arterial and venous vessels, nerves, tissues etc.). The physical component has virtual components integrated into it (software applications interconnected with the anatomical model and based on 3D technology, immersive reality, augmented reality) which are involved in implementing all and/or some of the provided surgical steps.

The main features of the simulation device according to a preferred embodiment of the present invention are as follows:

1) Providing the user with a surgical and anatomical perspective (inverted view through a small access) of the neuroanatomy, unlike standard anatomical models.

2) Providing information on the trigonometric type (X, Y and Z) relative to the exact position in space of the head, or body part, of which a section is being represented. It is noted that, in view of the depth and the reduced access spaces, the anatomical structures (in particular in neurosurgery) are perceived completely differently depending on the position of the head. A few degrees completely alter the perspective, affecting the surgeon's recognition of structures and visuospatial orientation.

3) Providing the user with interaction with a realistic physical environment capable of faithfully representing the tactile and visual experience of the specific surgical scenario under study, as well as the dimensional limits (surgical space) and manoeuvring limits imposed by visual instruments such as a surgical microscope.

4) Integrated use of different digital technologies (e.g. 3D animations, augmented reality, immersive reality and others) and physical technologies (for example ultrasoft synthetic materials) which are involved simultaneously and/or sequentially in implementing the complete sequence of steps of the individual experience (surgical procedure).

For example, if the aim of the simulation is to learn the techniques and manual experience of micro-suturing an arterial vessel of the brain, the steps of opening and closing the skull are implemented through the use of digital technologies, whilst the physical components of the simulation will be required to represent as realistically as possible the cerebral mass, which the user has to retract to open the access path to the underlying vessels to be sutured, and the blood vessels themselves for the actual suturing step of the blood vessel, which will be carried out manually (realistic tactile and visual experience) using an appropriate needle and thread as well as suitable surgical equipment (training of manual and visuospatial skills and of surgical ergonomics).

In a specific embodiment of the present invention relating to the human skull, the system of the present invention comprises a physical module 100, shown in FIG. 1, comprising a container 101 which simulates a portion of the cranial cavity, having an opening 103 for allowing surgical access to the interior. The opening 103 has the function of simulating a craniotomy window, obtained by craniotomy in preparation for a surgical intervention. The material and shape of the container 101 may vary depending on the usage requirements and the manufacturer's choices. In particular, the material has to guarantee provision of tactile and visual feedback which is as close as possible to the actual nature of the represented anatomical structure (ultra-realistic anatomical models). In accordance with a preferred embodiment of the present invention, it may comprise one or more of the following materials: silicone and polyurethane rubbers, silicone gels, resins, expanded polyurethanes (see table A). The chosen materials serve to reproduce the consistency, reaction to deformation, lustre and colour of the organic tissues. In particular, the gels and silicone rubbers offer Shore softness indices and elastic return times upon deformation similar to brain tissue, muscle tissue and adipose tissue. Rubbers, meanwhile, offer higher typical elasticity than more rigid materials, and, together with some resins, a level of fragility and friability similar to cartilage and ligament tissues. Finally, expanded polyurethanes, because of the internal porosity and external compactness thereof, simulate the consistency and appearance of human cancellous and compact bone tissue respectively.

TABLE A

| PART | | DESCRIPTION AND HARDNESS OF THE MATERIALS | | |
|---|---|---|---|---|
| Lower container | Universal | The lower part of the cerebral cavity which contains the surgical scenario. Supported on an articulated base. | ABS (acrylonitrile butadiene styrene) | Shore D 50-80 |
| Internal anatomy module (IAM) | Specific | Contains all the anatomical structures of a specific scenario. For example, in the pterional approach scenario, the internal surface thereof represents part of the base of the anterior/central skull. | Polyurethane rubber | Shore A 20-60 |
| Right/left hemisphere | Specific | Portrays part of the frontal and temporal lobe of the brain. | Soft multilayer silicone gel | Shore 00 0-10 |
| Brain stem | Specific | Part of the brain stem with cranial nerves II and III. | Polyurethane rubber | Shore 00 30-50 |
| Arterial blood vessels | Specific | Part of the anterior and posterior circle of Willis. | Rubber silicone | Shore 00 30-50 |
| Craniotomy | Specific | The upper part of the cerebral cavity, and represents the surgical window/opening to the internal anatomy. | ABS (acrylonitrile butadiene styrene) | Shore 00 50-80 |
| AR marker | Specific | Articulated to the craniotomy, and contains the reference for the augmented reality program. The program superposes a 3D animation of all the surface tissues of the skull. | Polyurethane rubber | Shore D 10-30 |

The shape of the container 101 has to meet the requirements for studying and simulating the brain. The opening 103 allows the user/student/surgeon vision of and access to the brain model portion container in the container 101.

The container 101 is suitable for accommodating a model 105 of a portion of the anatomical part of interest, in this case the brain, and models of all the other neuroanatomical components (e.g. brain stem, blood vessels, nerves).

In the device according to a preferred representation of the present invention, the representation both of the cranial cavity and of the contents thereof is partial, in the sense that an arbitrarily defined volumetric section (for example a cubic volume) is to be represented. This has the object of better concentrating the attention of the user on a precise region, made accessible through a craniotomy window in a particular position, and of allowing the interchangeability of the internal components of the device for the purpose of switching from one surgical scenario to another completely different one. This choice is intended to simulate the real situation, where the accessibility of the interior of the cranial cavity has objective limits due to the volumetric section of the cranial cavity performed on the hypothetical patient, which for obvious reasons has to be as limited as possible. In addition, this choice facilitates the implementation of a device of reduced dimensions and low cost, capable of simulating the movements for example of the entire human skull much more easily by virtue of the visual aid of the augmented reality, which virtually completes the whole, of which the physical volume section is merely a part.

The material of the brain model may vary, but should be suitable for reproducing the physical characteristics (consistency, level of hardness, plasticity/elasticity, deformation/return rate) and appearance (lustre, colour, surface pattern) of the human brain. In a preferred embodiment of the present invention, the brain model is formed from silicone, but another material which can appropriately simulate the characteristics of the represented anatomical portion could alternatively be used.

In one possible embodiment of the present device, the craniotomy opening may not be present by default (model with the skull or the other tissues still closed), but rather be reproduced by way of closed parts composed of materials similar to human bone, which are to be dismantled surgically using surgical tools (surgical drills etc.), by virtue of the modular nature of the device and the low cost of the disposable replacement parts. This option would allow the student/trainee to practise within the neurosurgical procedures, making the didactic experience even more real.

Operation Box (BXO)

Figure 2:
FIGS. 2 and 3 show a component of the simulator of FIG. 1.

In a preferred embodiment of the present invention, the container 101, also referred to as an operation box (BXO) hereinafter, is open in the upper part and has a hemispherical part in the lower part, as shown in FIG. 2. The dimension of the container is developed to represent a realistic surgical space. The BXO is set up to accommodate in the interior thereof the neuroanatomical models from the specific surgical scenario, which will be introduced by means of an assembly module (described in greater detail hereinafter).

Figure 3:
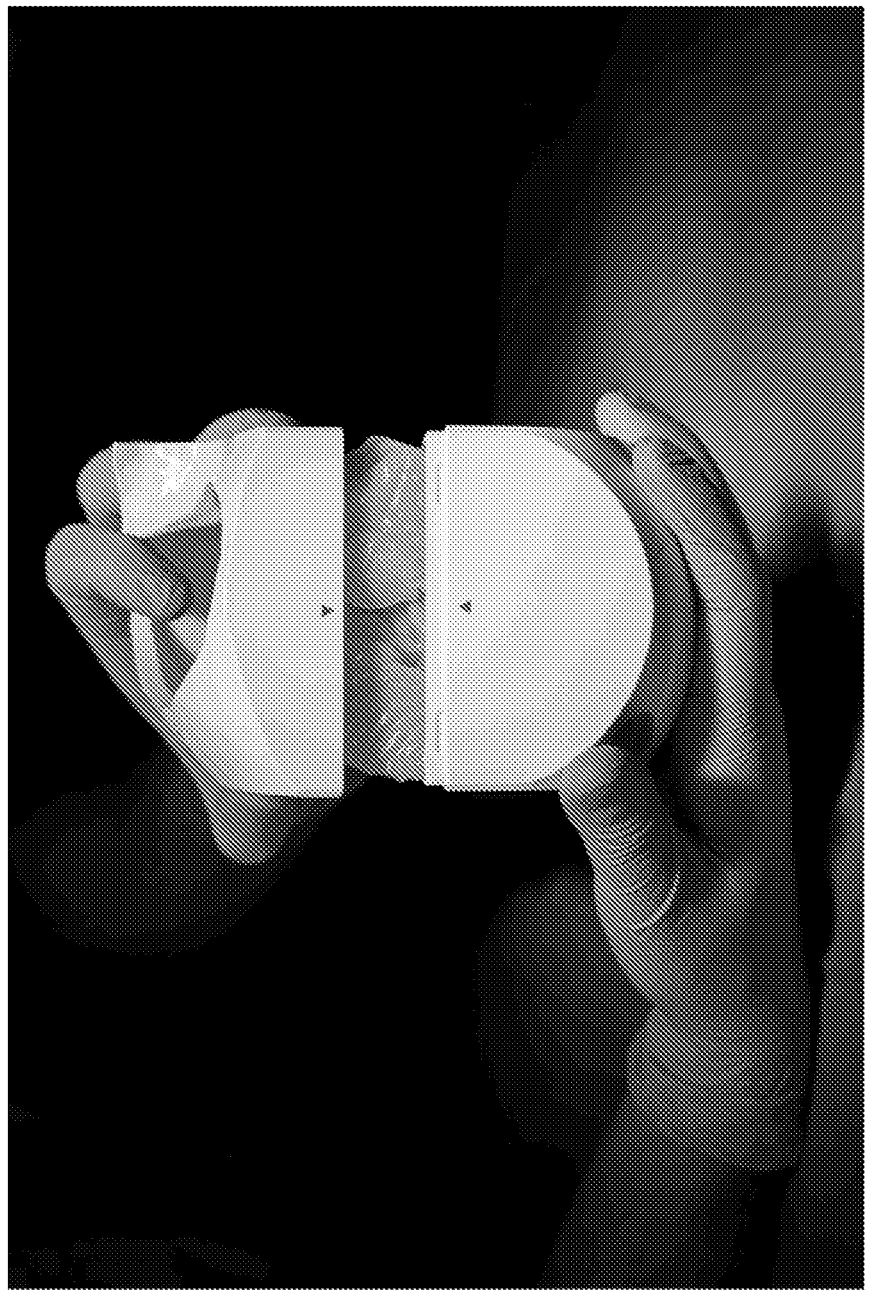

The BXO is set up for attaching an upper module referred to as the opening region, which represents the skull part with the special surgical window (in this case craniotomy) and is described hereinafter, and which also acts as an upper closure to the BXO 101, and remains fixed to the container via a special locking system (FIG. 3) which is to form a whole therewith. The upper part of the BXO (upper edge) is set up to accommodate any rubber gaskets for sealing when liquid material is used in the scenario.

In a preferred embodiment of the present invention the lower part of the container is of a substantially hemispherical shape and is designed so as to interface correctly with a corresponding support system referred to as the support base (described hereinafter), which has a corresponding concavity for allowing the BXO 101 to rotate in all directions once mounted. There is also a recess for locking the BXO in a fixed position by interlocking. The shapes of the container 101 and the means thereof for interfacing with/connecting to the base depend on the specific structure of the base and of the fixing system, which may take on various features: the shared and essential feature of the base and of the interaction thereof with the container 101 is that the container 101 is allowed all (or some) movements which are useful for simulating the real movements of the skull as part of the human body.

Part of the volume of the BXO is provided and developed to contain other electrical or electronic equipment or else liquid material required for configuring more realistic surgical scenarios (e.g. blood circulation simulation).

The lower hemispherical surface of the BXO, according to the embodiment described and illustrated here, may include a recess of cylindrical shape which forms the system for attaching and locking the container on the positioning base (Registered European Model No. 004254506-0001, having a movement function of the BXO along quantifiable Cartesian axes).

In a preferred embodiment of the present invention a plurality of containers are provided, each corresponding to a brain portion and to an associated craniotomy window, so as to allow simulation and study of different regions of the brain with surgical access from various positions and inclinations. The craniotomy windows are to simulate the various approaches normally used in neurosurgery. In a preferred embodiment of the present invention, craniotomy windows are provided for one or more of the following skull portions:

standard pterional (frontotemporal);
mini pterional;
frontal unilateral;
frontal bilateral (trans-sinus);
temporal;
fronto-orbital (FO)
fronto-orbital zygomatic (FOZ);
frontotemporal-orbital-zygomatic (FTOZ);
parasagittal;
supraorbital;
occipital median
occipital paramedian;
suboccipital median;
suboccipital paramedian;
retrosigmoid;
anterior transpetrosal;
posterior transpetrosal.

The opening operating region component (indicated hereinafter as OZ—opening zone) is the upper cover of the BXO and is connected and fastened at the upper part of the BXO. The OZ models the external surface of the scenario.

In the case of neurosurgery, it represents the skull portion of interest from the specific approach, and it is usually called craniotomy.

Those skilled in the art will easily appreciate that further particularisation of the craniotomy opening is possible, with a larger number of regions and sub-regions, just as it is possible to combined two or more neighbouring regions into a single opening. It is thus clear that the more limited the regions are, the higher the precision of representation of the model will be.

The opening (also defined as OZ hereinafter) may already contain a hole which represents the surgical entry opening, implemented with dimensional features and in a shape in accordance with standard technology, or else is closed or half-open depending on whether or not the aim of the simulation includes physically performing the craniotomy.

In some cases, the OZ has more entry apertures, which correspond to different possible approaches which can be made in the same reference surgery region. In the case of neurosurgery, this may take place for example in the frontotemporal region, where it is possible to make various accesses which are superposed in part or in some cases enclosed within one another, for example supraorbital as part of a broad frontotemporal.

In the case of neurosurgery, the OZ represents a part of the skull and thus rigid bone, and therefore consists of rigid material. The type of material used varies depending on the intended use. If the scenario provides the actual step of opening the skull or the step of drilling the bone, the OZ is formed using variable-density materials to reflect the various types and layers of cancellous bone. If the scenario does not provide simulated physical activities on the bone component, the material used is a rigid plastics material similar to that of the BXO.

In cases other than neurosurgery, the OZ generally consists of soft tissue, and the component is thus formed using materials of varying nature which are rigid in part (external frame of the OZ) and soft in part and which simulate the specific anatomical characteristics of that surgical scenario.

The OZ is characterised in that in reproduces the surface anatomy section of the human body region in question from the specific surgical scenario, and is developed, as stated above, to be combined with and fastened onto the BXO to form a single, cohesive container.

Figure 4:
FIG. 4 shows an example reproduction of an anatomical part (in this case a brain portion) container in the surgical simulator according to a preferred embodiment of the present invention.

The BXO container 101 is shaped appropriately for housing the internal anatomical parts of the brain, as shown in FIG. 4. There may be multiple anatomical parts (also referred to hereinafter as APs) involved in the simulation scenario, and the number, shape and material thereof depend on the aim of the scenario for which they are intended.

Indeed, a particular surgical scene can be implemented in different versions depending on the type of simulations for which it is developed.

By way of example, in a pterional approach, the APs are the brain stem, some cranial nerves, a model of arterial/venous vascular tree, a portion of the left hemisphere of the brain and a portion of the right hemisphere of the brain. In a development of this scenario, components characteristic of some pathologies (e.g. tumours, aneurysms etc.) may also be added.

The anatomical parts may be formed solely in the physical form thereof, only interacting with the user through touch and sight. In a further embodiment of the present invention, the anatomical parts may be furnished with sensors capable of measuring parameters which are useful for evaluating manual performance (e.g. performance of a vascular bypass) or physical parameters such as the force exerted on the anatomical models (e.g. mechanical stress parameters on the cerebral parenchyma which are useful for identifying critical ranges of possible iatrogenic lesions). These parameters can optionally be monitored using specific dedicated softwares which are also capable of providing real-time feedback or performance statistics.

Figure 5A:
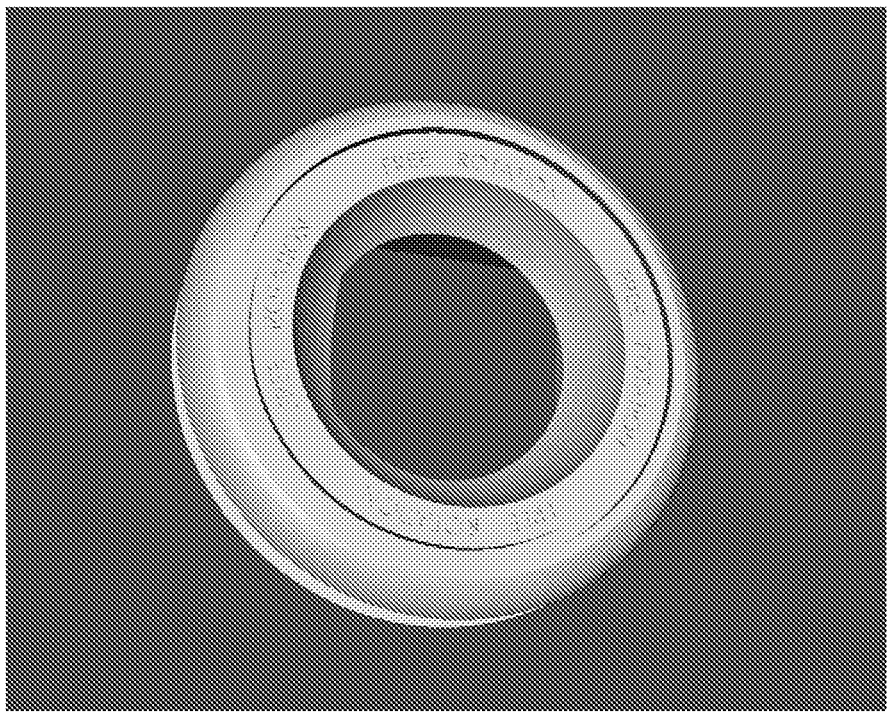
FIGS. 5 and 6 show two possible types of support for the surgical simulator.
Figure 5B:
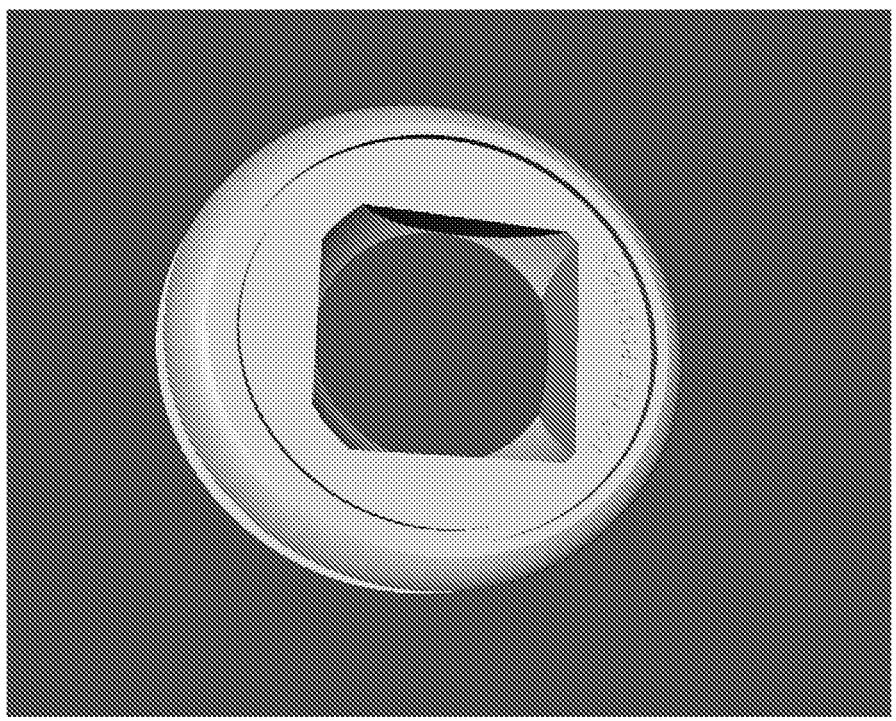
Figure 6:
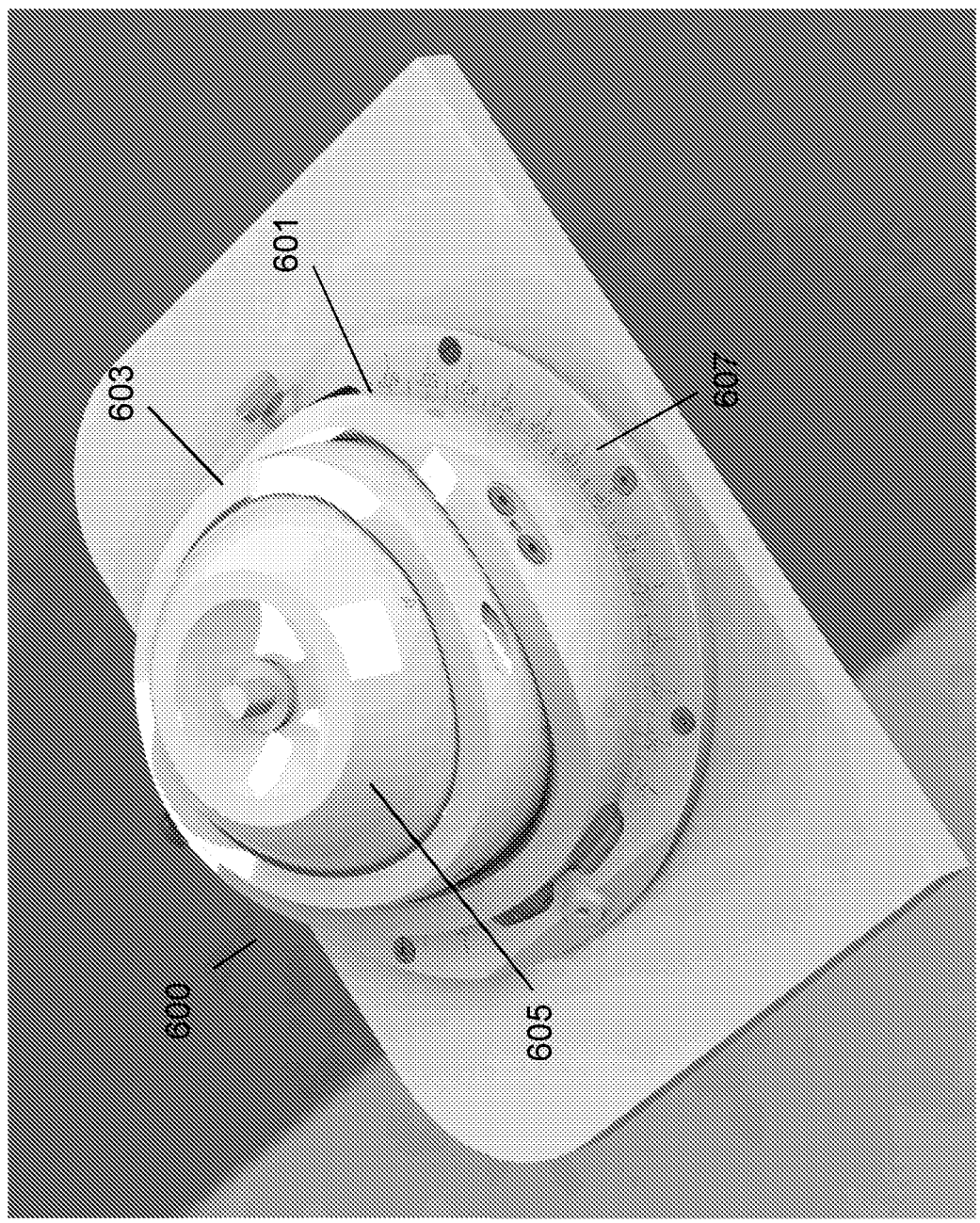

In a preferred embodiment of the present invention, the container 101 is supported by a controllable support 107, which has the purpose of simulating the movement of the skull, a portion of which is represented by the container 101, in three-dimensional space. It is possible to use a simple support having a support base without mechanisms which measure and control the position thereof in three-dimensional space, but it is clear that for objects where the precision of the positioning is essential, a precise positioning system is preferable. Two possible implementations of the support base are described hereinafter by way of example. The support 107, in the simplest version thereof, is better illustrated hereinafter with reference to FIG. 5, whilst FIG. 6 shows a more complex support having a goniometric base, for which a European Model or Design (No. 004254506-0001) has been registered in the name of the Proprietor of the present Patent Application. Experts in the field will understand that other solutions are also possible depending on the intended use of the learning system and on the required precision.

Internal Anatomy Module (IAM)

The internal anatomy module (intracranial in this case) contains all the specific deep anatomical structures of the surgical scenario (e.g. specific vessels and nerves etc.). This module will be referred to as the IAM (internal anatomy module). The IAM is the functional reference component for implementing a particular surgical scenario for which it is developed. In one possible embodiment, the BXO container 101 is a simple universal housing on which a specific IAM is to be mounted, being, depending on the circumstances and the requirements, an assembly module of the internal anatomy. The development of the IAM makes it possible to decouple the general components of the learning system from those specific to the scenario. Therefore, the development of the IAM is particularly complex and critical to the success of the entire development of the scenario.

The IAM is developed to be accommodated in the internal part of the BXO (which in one possible embodiment of the present invention may have a square profile): the IAM slides vertically within the BXO and is supported on 4 support brackets present within the BXO.

The IAM contains the anatomical elements which are functional in the surgical scenario for which it is developed. In the pterional neurosurgical scenario mentioned above, for example, the IAM contains part of the tentorium and part of the skull profile of the patient, within which the optical nerve is inserted and from which the internal carotid arteries emerge.

FIG. 4 shows an embodiment of an IAM for a pterional neurosurgical scenario.

The design and anatomical shapes of the IAM are developed in such way that the other components of the surgical scenario are assembled within its volume.

The IAM is preferably formed using materials which are soft or semi-rigid depending on the circumstances, and in any event are close to reality, or else it may consist of rigid plastics material or of polyurethane or of metal or of rubber or silicone materials or of a mixture of the aforementioned.

Support Base

The support base is the component of the system described herein which makes it possible for the BXO to be translated, to rotate in any plane, and to be fixed in one position.

Two possible example embodiments are described:
a. Standard dual-function base (FIGS. 5*a* and 5*b*)
b. Goniometric base (FIG. 6 having registered EU model No. 004254506-0001)

a. Standard Dual-Function Base

This base has a substantially cylinder-based shape, with a through-hole in the centre. In a preferred embodiment, the material used for the base is ABS (Acrylonitrile Butadiene Styrene).

The two surfaces of the support base are developed differently, with the aim of providing different functionalities depending on whether the BXO is housed on one side or on the other.

One side (FIG. 5*a*) contains a concavity corresponding to the hemispherical convexity of the BXO. When the BXO is accommodated on this side, it can easily rotate freely about the X, Y and Z axes of the space while having a fixed centre of rotation. The movement in this mode takes place freely, or without the possibility of breaking down or goniometrically quantifying the movements.

Figure 7:
FIG. 7 shows the interaction between a mobile device having an augmented reality (AR) application and the surgical simulator.

In this mode, the user simulates the operating step of positioning the head of the patient by observing the movement of the entire skull of the patient: using an augmented reality app, a model of the head of the patient is displayed, and in this way it is possible to observe how the surgical viewpoint is altered (for viewing the BXO and the contents thereof) upon altering the degrees of rotation (FIG. 7).

Communication between the BXO and the digital application takes place via a suitable marker, which is mounted on a point of the same BXO and which, once brought into frame, brings about the projection of the models in a congruent position and in continuity with the real models, representing the integration thereof (e.g. the entire head of the patient in virtual form superposed on the physical head section). In a further possible embodiment, said marker is replaced by sensors for measuring distances and positions in space.

The other side of the base (FIG. 5b) is developed in such a way that, at the central through-hole, there is a recess capable of accommodating the BXO in an interlocking manner and fixing it in a specific position.

In this way, when the BXO is positioned within this side of the base, it remains locked and prevented from performing any rotation. In this position, the user, using the suitable surgical instruments furnished, can exert more intense retraction forces on the model because the BXO is stable and firm.

The lateral profile of the base contains a groove developed for enclosing a movable locking system of the base at the support plane.

On the two (upper and lower) surfaces, the base may provide a groove for containing rubber holding rings, which form the soft contact of the base of the support plane, so as not to scratch the plane and give the base greater friction in the sliding, limiting the mobility thereof on the plane.

b. Goniometric Base

This base 600, shown in FIG. 6, has the object of quantifying the various degrees of movement of the BXO, and thus of the head of the patient. The positioning of the head of the patient has a fundamental role in planning neurosurgical procedures, since a few degrees can change the visual perspective of the intracranial target to be reached and make it even more difficult to reach. Furthermore, incorrect positioning of the head can have a negative influence on the position which the surgeon has to adopt for operating, compromising the quality of the act of surgery itself.

The positioning base is a system of concentric spheres and spherical caps (e.g. hemispheres) which makes controlled and measured rotations possible about the three axes of space.

A first spherical cap 601 serves to orientate the system along the X axis.

A second spherical cap 603, within the first cap 601, serves to orientate the system along the Y axis.

Within the first two caps there is then a third cap 605 for the Z axis, which may also be a complete sphere since it does not have to contain further spheres.

In particular, this makes possible the three main rotations of the head:
rotation
flexo-extension
lateral tilt Academically, each neurosurgical approach is linked to specific excursion ranges in terms of rotation, flexo-extension and lateral tile, naturally taking into account the anatomical variation between individuals and the specific type of pathology.

The three movements on the goniometric base are independent and quantifiable. Each of them takes place along a graduated measurement scale 607, which reports the degrees of the applied rotation. Once the desired rotation has been applied, the system is locked by the user by means of suitable locking screws. Each rotation is applied and controlled independently of the others and has its own locking screw.

In a preferred embodiment of the present invention, in the top part, the base has an attachment system corresponding to a recess present on the hemispherical surface of the lower part (described above) of the BXO.

When the BXO is positioned on the base using the provided attachment system, the system of rotations of the base will bring about angles of rotation on the BXO which correspond to the real angles of the complete head of the patient and suitably measured (and indicated on the positioning base) angles of rotation of the head of the patient. Once the angles of rotation have been applied as indicated in academic textbooks for the specific surgical procedures, the user can visually take into account how the surgical perspective is altered upon alteration of the individual angles of rotation. In this way, the user will understand, through a direct experience, the perspective effect of the applied individual angles of rotation.

In the same way, a BXO developed for a specific case (patient-specific) will be able to allow ideal positioning angles for the analysed case to be simulated.

In a preferred embodiment of the present invention, the physical module 100 can be connected to a data processing system provided with a suitably developed software which makes it possible to recreate, for example on a screen of a mobile device, an augmented reality (AR hereinafter) simulation of the human skull and the contents thereof.

This takes place through recognition of a particular physical graphical element (marker) at the moment when it is brought into frame by the camera of the device (smartphone or tablet). In this way, it is possible to reconstruct, on the basis of trigonometric calculations, the position, rotation and movement of a virtual video camera in the 3D scene corresponding to the camera of the device in use, subsequently superposing, on the streaming video coming from said camera, the image of a 3D model in the correct perspective. In this way, the images of reality are augmented with the 3D content, or real-time 3D animations of the neurosurgical approach associated with the marker itself or 3D models.

The software further makes it possible to merge AR with virtual reality (VR hereinafter) using a universal viewing device capable of accommodating the smartphone, giving the user the option of appreciating augmented reality moving within the object hands-free.

It is possible to integrate further sensors which return physical interaction parameters to the software. The software receives, from the physical module 100, the signals originating from the interaction of the user with the device itself. These signals may include the movements of the container 101 (and, for augmented reality simulation, those of the whole hypothetical skull) by means of the degrees of freedom of movement of the support 107. In a further embodiment of the present invention, the model of the anatomical part 105 (e.g. the cerebral matter) is provided with sensors which detect physical stress parameters on the anatomical models (for example retraction pressure on the brain); these sensors will optionally be able to provide parameters useful for learning the manual skills which are functional in correct microsurgical manipulation of the anatomical structures.

The integration between the physical components of the system as described above and the augmented reality simulation carried out using computing tools is one of the fundamental features of the simulation system according to the present invention.

In a preferred embodiment of the present invention, the steps of the surgical procedures are represented by systems which are digital in part (by way of animations, images, interactions with digital models and/or objects on mobile devices) and physical in part (interaction with physical models of operating scenario).

Figure 8:
FIG. 8 shows the simulator with the marker for the use of the augmented reality according to a preferred embodiment of the present invention.

The digital models are represented using augmented reality technology. In particular, each surgical scenario is provided with an AR marker which is recognised by the app (FIGS. 7 and 8).

Once the app is activated on the mobile device and the marker is brought into frame with the video camera of the device, the app recognises the marker and activates the correct procedure or the module of the scenario to which the marker refers.

From that moment onwards, while keeping the marker in frame with the video camera of the device, the real images are augmented by the digital app, which integrates the scene together with digital components and objects which are superposed on the real images in the frame of the video camera. In particular, as regards the neurosurgical box, the physical model represents all the structures from the external bone to the intracranial structures, while the augmented reality represents all the epicranial soft tissues.

In a preferred representation of the present invention, each surgical scenario has a corresponding digital module which implements one or more steps of the surgical procedure by interacting with the physical platform (composed of BXO, support base, OZ, AAM and AP).

The app uses augmented reality (AR) components to integrate the images of the physical module and provide a complete view of the patient, of the skull and/or of other anatomical parts which have no physical equivalent.

In a further embodiment of the present invention, virtual reality components are used which allow a greater capacity of providing the ambience of the surgical scenario (thus being able to influence the emotive conditions of the user more directly, with the aim of training him/her to manage the intervention in emotional as well as perceptive terms)

group simulations even at a distance, where the users are more than one at a time but they are physically in different places at a distance from one another.

Figure 9:
FIG. 9 shows a possible use of the system according to a preferred embodiment of the present invention.

In this case, the mobile device is the viewing device for immersive reality (FIG. 9) through which the user is brought into a virtual reality (e.g. an operating room) within which he/she performs the operation task by interacting with the learning system and with other virtual actors (e.g. other trainees).

In the case of the pterional approach, the app makes it possible to implement the step of positioning the head and the step of opening the skull (craniotomy) until there is intracranial access. During the positioning phase, the app shows the complete skull of the patient by superposing digital images on the image of the physical module in such a way that the user has perfect awareness as to which skull portion is subject to the simulation and how the rotations about the three spatial axes influence and potentially affect the surgical scene.

During the opening step, the app shows an animation of the steps of opening the soft epicranial tissues so as to arrive at the interior of the skull. In particular, once the meninx (dura mater) is open, the app shows the physical brain contained in the device, encouraging him/her to perform the exercise on the physical model.

At this point, the user proceeds to pursue the exploration of the anatomy through the use of suitable surgical instruments for retracting the cerebral tissue and manipulating the deeper anatomical structures. When the user has completed the exploration, returning to the digital app, it will be possible for the surgical closing animation to follow in the same manner in which the opening was displayed.

Figure 10:
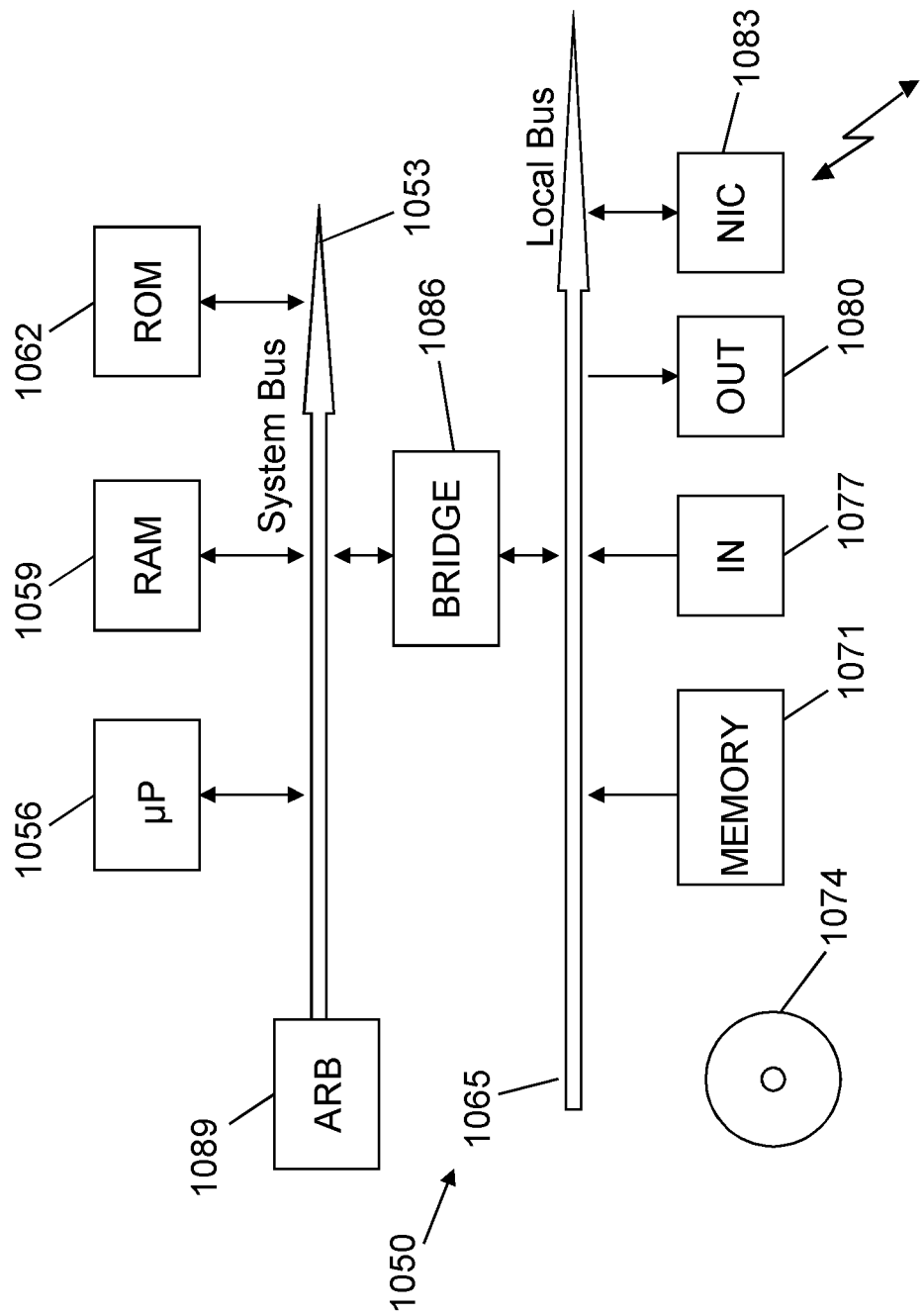
FIG. 10 schematically shows generic hardware used in the system according to a preferred embodiment of the present invention.

FIG. 10 shows a generic computer used in the system according to the preferred embodiment of the present invention. This generic description includes any apparatus provided with processing power, albeit with different levels of sophistication and functionality (e.g. computers, mobile terminals, smartphones, servers, network routers, proxy servers). The computer 1050 consists of various units which are connected in parallel to a system bus 1053. In detail, one or more microprocessors 1056 control the operation of the computer and a RAM 1059 is used directly as a working memory of the microprocessors 1056, while a ROM 1062 contains the base code for the initial loading activity of the system (bootstrap). Various peripheral units are connected to a local bus 1065 by means of appropriate interfaces. In particular, these peripheral units may include mass storage formed by a hard disk 1071 and one or more external memories comprising various types of carriers (e.g. SD cards, USB keys, memories linked to a cloud) 1074. In addition, the computer 1050 may comprise and/or be connectable to input devices 1077 (e.g. keyboard, mouse, track point, video camera, webcam) and output devices 1080 (e.g. screen, printer). A network interface card 1083 is used for connecting the computer 1050 to a network. A bridge unit 1086 forms the interface between the system bus 1053 and the local bus 1065. Each microprocessor 1056 and the bridge unit 1056 can operate as a master agent and request exclusive access to the system bus 1053 to transmit information. An arbiter 1089 manages the requests for access to the system bus 1053, preventing conflicts between the requestors. Similar considerations apply to systems which are slightly different or based on different network configurations. Other components further to those described may be present in specific cases and for particular implementations (e.g. palmtop computers, mobile telephones etc.).

The device described in the present patent application has the object of simulating the movement and morphology of an anatomical part of the human body, for example a portion of the human skull and brain. This simulation has the object of making it possible to study the anatomical part of interest and to recreate conditions as close as possible to the reality in which a surgeon finds himself/herself when performing interventions on the anatomical part. In general, the method comprises the steps of:

acquiring, through the image acquisition system, a representation of the plurality of anatomical elements;

receiving information on the position and orientation of the container from the movable support;

acquiring, from each of the plurality of markers, information on the position and one or more characteristics of the anatomical element associated with each marker;

generating an augmented reality representation of the anatomical part and representing said view on a monitor.

The method for simulating neurosurgical procedures according to a preferred embodiment of the present invention is characterised by the sequential integration of virtual simulation phases, based on virtual representations of the surgical scenario, and physical simulation phases, based on physical representations of said scenario. The method may be used for example for AR/VR representation and management of the model of a human skull and of the portion of central nervous system contained therein. The method is implemented and operates on a data processing system connected to the device described above, with which a user/student/surgeon can interact by means of input/output instruments which make it possible to simulate the examination and surgical intervention actions on the skull and the model represented using the augmented reality.

The device and method as described above can be subjected to numerous modifications and variants while remaining within the scope of the invention: furthermore, all of the details may be substituted with other technically equivalent elements without departing from the scope of protection of the present invention as a result.

In practice, the materials used, as long as they are compatible with the specific use, as well as the dimensions can be varied in accordance with the requirements and the prior art.

The invention claimed is:

1. System for simulating the movement, morphology, surgical approaches, positioning, and movement in three-dimensional space of an anatomical part of the human body, including:
   a three-dimensional physical module for representing a delimited volume of an anatomical part of the human body comprising a container that defines the volume, comprising a plurality of internal interchangeable anatomical elements, the container having an opening representing a predetermined surgical access path for operating within the anatomical part included in the container;
   a support movable in three dimensions to position and orientate the container in three-dimensional space;
   a digital image processing system;
   at least one marker associated with and positioned on the container and/or on the anatomical elements, each of the at least one marker being suitable for identifying the position in three-dimensional space and one or more characteristics of the container or of the associated anatomical part and transmitting the information on the position and on the one or more characteristics to the digital image processing system;
   an image acquisition system suitable for capturing the image of the container, the anatomical elements and the at least one marker and transmitting them to the digital image processing system,
   the image processing system being adapted to integrate the information received from the at least one marker and from the image acquisition system with additional, virtual elements so as to generate an augmented reality view which includes anatomical volumes and layers which complete the partial physical representation of the anatomical part and to represent said view on a monitor.

2. The system of claim 1, wherein the digital image processing system and the image acquisition system are integrated into a single system.

3. The system of claim 1, wherein the anatomical part is composed of a plurality of layers and/or volumes and wherein the physical three-dimensional module has virtual components integrated in such a way that at least one of the layers and/or volumes of at least one section of the anatomical part are physically represented by the three-dimensional physical module and at least one of the layers and/or volumes of the anatomical part are virtually represented digitally, the at least one physical representation and the at least one virtual representation being integrated together to implement an augmented reality representation and to simulate the sequence of surgical steps of a predetermined procedure or of a predetermined pathological condition.

4. The system of claim 1, wherein the container is adapted to accommodate a plurality of internal interchangeable anatomical modules comprising anatomical elements, each anatomical module representing an anatomical layer of the represented anatomical part.

5. The system of claim 1, wherein the container represents a predetermined volume of the human skull and the access path is a craniotomy/craniectomy window for allowing access to the internal anatomical elements.

6. The system of claim 5, wherein the physical module represents the elements of a subset of the volume of the skull and of the intracranial anatomical structures, while the augmented reality represents the integration of the remaining skull volume and the remaining extracranial anatomical layers, completing the surgical steps of the procedure for surgically accessing the internal anatomical components sequentially, by alternation of physical and virtual representations of the structures involved.

7. The system of claim 5, wherein the anatomical elements comprise one or more of the following: cerebral/cerebellar parenchyma, brainstem, cranial nerves, arterial/venous vessels, venous sinuses, meninges (dura mater, arachnoid, pia mater), biological fluids (cephalorachidian fluid, blood), each of the plurality of anatomical elements included in the container being made of material that reproduces the physical characteristics of the corresponding real anatomical element.

8. The system of claim 5, wherein the opening of the container is covered so as to simulate an integral portion of human skull corresponding to a predetermined surgical window for operating within the anatomical part included in the container, the portion of human skull being prepared to be incised during a surgical simulation of a craniotomy/craniectomy intervention.

9. The system of claim 5, wherein the support is connected to the image processing system and set up to transmit information on the position and orientation of the container to the digital image processing system.

10. The system of claim 9, wherein the augmented reality view generated and displayed by the digital image processing system is also based on the information received from the support.

11. The system of claim 9, wherein the support comprises three concentric spherical caps, each of the spherical caps being set up to move along one of the spatial coordinates of a three-dimensional Cartesian system.

12. The system of claim 9, wherein the image acquisition system develops a representation of the plurality of anatomical elements, a plurality of 3D animations, a plurality of useful pieces of information for guiding the surgical tasks, a plurality of models corresponding to surgical instruments linked to specific markers, and a plurality of pieces of information derived from all of these markers.

13. Container representing a portion of an anatomical part of the human body, comprising a plurality of anatomical elements, the container being suitable for use in the system of claim 4.

14. Method for simulating the movement and morphology of an anatomical part of the human body by means of a system of claim 1, the method comprising the steps of:
   acquiring, through the image acquisition system, a representation of the plurality of anatomical elements;
   receiving information on the position and orientation of the container from the movable support;
   acquiring, from the at least one marker, information on the position and one or more characteristics of the anatomical element associated with each marker;
   integrating the information received from the at least one marker and from the image acquisition system with additional virtual elements so as to generate an augmented reality view which includes anatomical volumes and layers which complete the partial physical representation of the anatomical part, and representing said view on a monitor.

15. Method for simulating neurosurgical procedures, characterised by the sequential integration of virtual simulation phases, based on virtual representations of the surgical scenario, and physical simulation phases, based on physical representations of said scenario, using the method of claim 14.

\* \* \* \* \*